US010853353B2

(12) United States Patent
Balaraman et al.

(10) Patent No.: US 10,853,353 B2
(45) Date of Patent: Dec. 1, 2020

(54) BLOCKCHAIN-ENABLED DATASETS SHARED ACROSS DIFFERENT DATABASE SYSTEMS

(71) Applicant: American Express Travel Related Services Company, Inc., New York, NY (US)

(72) Inventors: Balaji Balaraman, Bangalore (IN); Shivakumar Chandrashekar, Bangalore (IN); Jitendra Singh Dikhit, Bangalore (IN); Andras L. Ferenczi, Peoria, AZ (US); Ashish Kumar, Bangalore (IN)

(73) Assignee: AMERICAN EXPRESS TRAVEL RELATED SERVICES COMPANY, INC., New York, NY (US)

(*) Notice: Subject to any disclaimer, the term of this patent is extended or adjusted under 35 U.S.C. 154(b) by 200 days.

(21) Appl. No.: 16/054,185

(22) Filed: Aug. 3, 2018

(65) Prior Publication Data

US 2020/0042625 A1 Feb. 6, 2020

(51) Int. Cl.
*G06F 16/23* (2019.01)
*H04L 9/08* (2006.01)
*H04L 9/32* (2006.01)
*G06F 21/60* (2013.01)
*G06F 16/25* (2019.01)

(52) U.S. Cl.
CPC ........ *G06F 16/2379* (2019.01); *G06F 16/258* (2019.01); *G06F 21/602* (2013.01); *H04L 9/0894* (2013.01); *H04L 9/3247* (2013.01)

(58) Field of Classification Search
CPC .. G06F 16/2379; G06F 16/258; G06F 21/602; H04L 9/3247; H04L 9/0894
USPC ........................................................ 707/756
See application file for complete search history.

(56) References Cited

U.S. PATENT DOCUMENTS

| | | | |
|---|---|---|---|
| 2017/0236123 A1* | 8/2017 | Ali | G06Q 20/3825 |
| | | | 705/75 |
| 2018/0253451 A1* | 9/2018 | Callan | G06F 16/211 |
| 2019/0013932 A1* | 1/2019 | Maino | G06N 20/00 |
| 2019/0158594 A1* | 5/2019 | Shadmon | H04L 67/42 |
| 2019/0199693 A1* | 6/2019 | Vityaz | H04L 63/0428 |
| 2019/0305950 A1* | 10/2019 | Treat | H04L 63/12 |
| 2019/0340216 A1* | 11/2019 | Dutta | G06F 16/258 |
| 2019/0356641 A1* | 11/2019 | Isaacson | G06Q 20/40 |

* cited by examiner

*Primary Examiner* — Evan Aspinwall
(74) *Attorney, Agent, or Firm* — Thomas | Horstemeyer, LLP

(57) ABSTRACT

A system for integrating blockchain-enabled shared datasets across databases having varying formats and structures is disclosed. The system may include various entity systems in communication via a peer-to-peer network. A first entity system may receive a dataset update request to update the shared dataset. The first entity system may broadcast the dataset update request across the network, and one or more entity systems connected to the network may consent to the dataset update request. The consenting entity systems may broadcast the consented dataset update request to the other entity systems connected to the network. Each entity system may update its local copy of the shared dataset with the consented dataset update request. Each entity system may comprise a mapping module configured to reformat the consented dataset update request into a format that can be stored in a local data structure.

20 Claims, 3 Drawing Sheets

US 10,853,353 B2

BLOCKCHAIN-ENABLED DATASETS SHARED ACROSS DIFFERENT DATABASE SYSTEMS

FIELD

This disclosure generally relates to datasets shared by entities, and more particularly, to systems and methods for blockchain-enabled datasets shared across different database structures and systems.

BACKGROUND

Entities may write and retrieve data from shared datasets. The shared datasets may be shared internally across systems within the entity, or externally across various different entities. Different systems and entities may employ varying data structures, database systems, and/or database management systems to store and maintain data. A technical problem is that each data structure, database system, and/or database management system may store and maintain data using different techniques and data fields.

One of the entities may typically host a central database to store the shared datasets. Internal entity systems or external entities may access the central database using a service-oriented architecture to write and retrieve data from the shared dataset. The entity hosting the central database may also establish a batch process to transmit data from the shared dataset to internal entity systems or external entities based on a specified time interval. The internal entity systems or external entities may need to reformat the received dataset prior to storing the data in the internal entity system's or external entity's native data structure. Entities desiring to implement a blockchain-based database system or network may also need to update system architectures and databases to a common database structure used by all internal entity systems or external entities using the blockchain network.

SUMMARY

A system, method, and computer readable medium (collectively, the "system") is disclosed for integrating a shared blockchain-enabled dataset across different database structures. The system may include one or more entity systems in communication over a peer-to-peer network. Each entity system may comprise an integration platform. An integration platform of a first entity system may receive a dataset update request comprising instructions to update a shared dataset, wherein the shared dataset is stored in a first data structure according to a first data format. The integration platform may broadcast over the peer-to-peer network the dataset update request to a second integration platform in the peer-to-peer network, wherein in response to receiving the dataset update request the second integration platform may be configured to consent to the dataset update request based on a consensus method. The integration platform may receive a consented dataset update request, wherein the consented dataset update request may be formatted in a second data format. The integration platform may determine whether the second data format of the consented dataset update request matches the first data format of the first data structure. In response to determining that the second data format does not match the first data format, the integration platform may reformat the consented dataset update request to comprise the first data format.

In various embodiments, the integration platform may write the consented dataset update request to the shared dataset in the first data structure. In response to consenting to the dataset update request, the second integration platform may be configured to broadcast the consented dataset update request over the peer-to-peer network. The second integration platform may be configured to write the consented dataset update request to the shared dataset in a second data structure associated with the second integration platform.

In various embodiments, the integration platform, via a cryptograph module, may sign the dataset update request using a public key associated with the integration platform. The consensus method may comprise proof of work, proof of stake, practical byzantine fault tolerance, or delegated proof of stake. The consensus method may also require consent from all integration platforms in the peer-to-peer network.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION

The subject matter of the present disclosure is particularly pointed out and distinctly claimed in the concluding portion of the specification. However, a more complete understanding of the present disclosure may be obtained by referring to the detailed description and claims when considered in connection with the drawing figures, wherein like numerals denote like elements.

DETAILED DESCRIPTION

Figure 1:
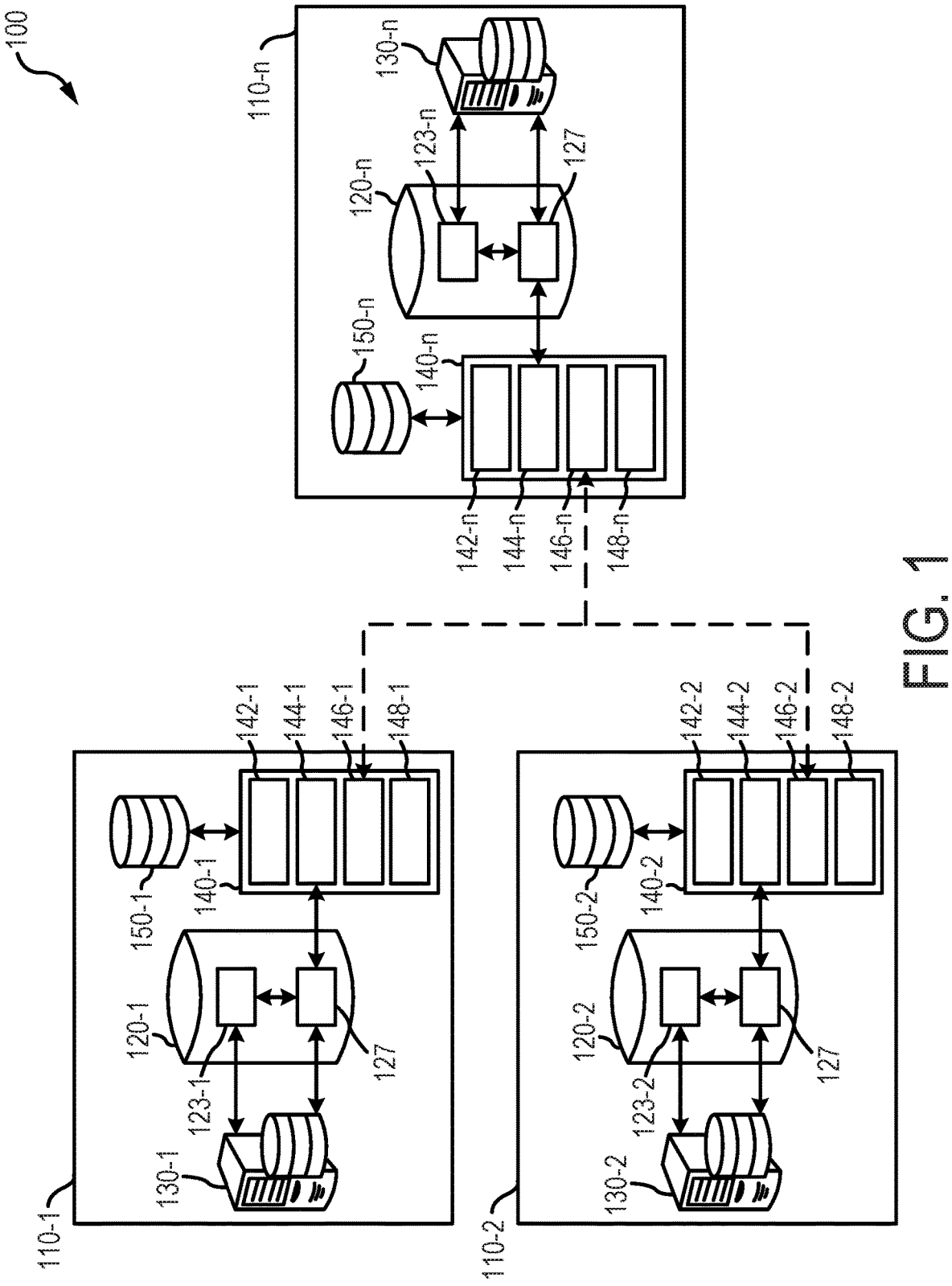
FIG. 1 is a block diagram illustrating a system for integrating a shared blockchain-enabled dataset across different database structures, in accordance with various embodiments.

The detailed description of various embodiments refers to the accompanying drawings, which show various embodiments by way of illustration. While these various embodiments are described in sufficient detail to enable those skilled in the art to practice the disclosure, it should be understood that other embodiments may be realized and that logical and physical changes may be made without departing from the spirit and scope of the disclosure. Thus, the detailed description is presented for purposes of illustration only and not of limitation. For example, the steps recited in any of the method or process descriptions may be executed in any order and are not limited to the order presented. Moreover, any of the functions or steps may be outsourced to or performed by one or more third parties. Furthermore, any reference to singular includes plural embodiments, and any reference to more than one component may include a singular embodiment.

The systems, methods, and computer readable mediums (collectively, the "system") described herein provide a technical solution to the technical problem of sharing a dataset across data structures, database systems, and/or database management systems having varying storage and maintenance techniques, formats, commands, and data fields. The technical solution provided herein may integrate a shared blockchain-enabled dataset across different database structures and systems. In that regard, the system may enable existing data structures, database systems, and/or database management systems to be used as a blockchain-based repository configured to store the shared dataset. Thus, the system may benefit from features of a blockchain such as, for example, security, privacy, immutability, fault tolerance, consensus and proof of work, cryptography, data replication, use of smart contracts, and the like. As discussed further herein, the system may provide an integration platform configured to facilitate validation, replication, manipulation, and consensus of the shared dataset amongst the different abstracted entities. The integration platform may be logically separate. The integration platform may be used in conjunction with an existing database structure, database system, or database management system. The integration platform may be a built-in feature of a database system or database management system.

The system further improves the functioning of the computer-based system and/or network. For example, by integrating a shared dataset across varying data structures and systems, as opposed to needing each entity or system to separately transform, store, and manage the dataset, the system shares the dataset more efficiently which speeds processing and decreases memory usage in each entity system, and decreases the amount of data transferred over the network. Additionally, by transmitting, storing, and accessing data using the processes described herein, the security of the data is improved, which decreases the risk of the computer-based system, network, or shared dataset from being compromised. Further, by decentralizing system architecture and centralizing the process of data transfers, less infrastructure may be needed compared to typical systems, and data may be shared to parties in real time or near real time As used herein, "electronic communication" means communication of at least a portion of the electronic signals with physical coupling (e.g., "electrical communication" or "electrically coupled") and/or without physical coupling and via an electromagnetic field (e.g., "inductive communication" or "inductively coupled" or "inductive coupling"). As used herein, "transmit" may include sending at least a portion of the electronic data from one system component to another (e.g., over a network connection). Additionally, as used herein, "data," "datasets," "information," or the like may include encompassing information such as commands, queries, files, messages, data for storage, and the like in digital or any other form.

With reference to FIG. 1, a system 100 for integrating a shared blockchain-enabled dataset across different database structures and systems is depicted according to various embodiments. System 100 may include various computing devices, software modules, networks, and data structures in communication with one another. System 100 may also contemplate uses in association with web services, utility computing, pervasive and individualized computing, security and identity solutions, autonomic computing, cloud computing, commodity computing, mobility and wireless solutions, open source, biometrics, grid computing and/or mesh computing.

In various embodiments, system 100 may comprise one or more entity systems 110 in electronic communication with each other. For example, system 100 may comprise a first entity system 110-1, a second entity system 110-2, and/or an "Nth" entity system 110-n. Although the present disclosure makes reference to first entity system 110-1, second entity system 110-2, and "Nth" entity system 110-n, it should be understood that principles of the present disclosure may be applied to a system having any suitable number of interconnected entity systems. In various embodiments, one or more entity system 110-1, 110-2, 110-n may comprise logically interrelated systems controlled by an entity, organization, or the like (e.g., subsystems within the same network). In various embodiments, one or more entity system 110-1, 110-2, 110-n may comprise systems controlled by separate entities, organizations, or the like. Entity systems 110-1, 110-2, 110-n may be in electronic communication with each other via a network, such as a peer-to-peer network.

As used herein, the term "network" may further include any cloud, cloud computing system or electronic communications system or method that incorporates hardware and/or software components. Communication among the parties may be accomplished through any suitable communication channels, such as, for example, a telephone network, an extranet, an intranet, Internet, point of interaction device (point of sale device, personal digital assistant, cellular phone, kiosk, tablet, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Moreover, although the system is frequently described herein as being implemented with TCP/IP communications protocols, the system may also be implemented using IPX, AppleTalk, IP-6, NetBIOS, OSI, any tunneling protocol (e.g., IPsec, SSH, etc.), or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein.

A network may be unsecure. Thus, communication over the network may utilize data encryption. Encryption may be performed by way of any of the techniques now available in the art or which may become available—e.g., Twofish, RSA, El Gamal, Schorr signature, DSA, PGP, PKI, GPG (GnuPG), and symmetric and asymmetric cryptosystems. Asymmetric encryption in particular may be of use in signing and verifying signatures for blockchain crypto operations.

In various embodiments, each entity system 110-1, 110-2, 110-n may comprise any suitable combination of hardware, software, and/or database components. For example, each entity system 110-1, 110-2, 110-n may include at least one computing device in the form of a computer or processor, or a set of computers/processors, although other types of computing units or systems may be used, such as, for example, a server, web server, pooled servers, or the like. Each entity system 110-1, 110-2, 110-n may also comprise one or components, databases, platforms, or the like. For example, and in accordance with various embodiments, each entity system 110-1, 110-2, 110-n may comprise a data structure 120 (e.g., entity system 110-1 comprises a data structure 120-1, entity system 110-2 comprises a data structure 120-2, entity system 110-n comprises a data structure 120-n, etc.), a data consumer 130 (e.g., entity system 110-1 comprises a data consumer 130-1, entity system 110-2 comprises a data consumer 130-2, entity system 110-n comprises a data consumer 130-n, etc.), an integration platform 140 (e.g., entity system 110-1 comprises an integration platform 140-1, entity system 110-2 comprises an integration platform 140-2, entity system 110-n comprises an integration platform 140-n, etc.), and/or a key repository 150 (e.g., entity system 110-1 comprises a key repository 150-1, entity system 110-2 comprises a key repository 150-2, entity system 110-n comprises a key repository 150-n, etc.).

For the sake of brevity, conventional data networking, application development, and other functional aspects of each entity system 110-1, 110-2, 110-n (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system. One or more individual components of entity system 110-1, 110-2, or 110-n may also comprise logical or virtual partitions of one or more other individual components in the entity system 110-1, 110-2, or 110-n.

In various embodiments, each data structure 120-1, 120-2, 120-n may comprise any suitable type of data structure, database, database system, database management system, or the like, capable of storing and maintaining data. For example, each data structure 120-1, 120-2, 120-n may be configured as a relational (e.g., SQL), non-relational (e.g., noSQL), hierarchical, graphical, blockchain, object-oriented structure, and/or any other database configuration. Each data structure 120-1, 120-2, 120-n may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement each data structure 120-1, 120-2, 120-n may include DB2 by IBM® (Armonk, N.Y.), various database products available from ORACLE® Corporation (Redwood Shores, Calif.), MICROSOFT Access® or MICROSOFT SQL Server® by MICROSOFT® Corporation (Redmond, Wash.), MySQL by MySQL AB (Uppsala, Sweden), MongoDB®, Redis®, APACHE CASSANDRA®, HBase by APACHE®, MapR-DB, or any other suitable database product. Moreover, data structures 120-1, 120-2, 120-n may be organized in any suitable manner, for example, as data tables or lookup tables. Each record may be a single file, a series of files, a linked series of data fields or any other data structure. In various embodiments, one or more of data structures 120-1, 120-2, and/or 120-n may each comprise a data structure having a different data format, and/or may be implemented using a different database product.

In various embodiments, each data structure 120-1, 120-2, 120-n may comprise various datasets accessible by components in each entity system 110-1, 110-2, 110-n, or to external components and systems in system 100. For example, data structures 120-1, 120-2, 120-n may comprise a private dataset 123 and/or a shared dataset 127 (e.g., data structure 120-1 may comprise a private dataset 123-1 and/or a shared dataset 127; data structure 120-2 may comprise a private dataset 123-2 and/or a shared dataset 127; data structure 120-n may comprise a private dataset 123-n and/or a shared dataset 127; etc.). Each private dataset 123-1, 123-2, 123-n and shared dataset 127 may comprise logical or physical partitions of the corresponding data structure 120-1, 120-2, 120-n. Each private dataset 123-1, 123-2, 123-n may be configured to store data that is only shared with components in the corresponding entity system 110-1, 110-2, 110-n (e.g., private dataset 123-1 stores data for use in only entity system 110-1). Shared dataset 127 may be configured to store data that is shared and synced with each entity system 110-1, 110-2, 110-n via the integration platform 140, as discussed further herein.

In various embodiments, each data consumer 130-1, 130-2, 130-n may be in electronic communication with a corresponding data structure 120-1, 120-2, 120-n. Each data consumer may comprise an internal or external system, data processing environment, server, application, or the like that is configured to interact with a corresponding private dataset 123-1, 123-2, 123-n and/or a corresponding shared dataset 127 (e.g., data consumer 130-2 may be configured to interact with private dataset 123-2 and/or shared dataset 127). For example, each data consumer 130-1, 130-2, 130-n may be configured to retrieve and write data to data from the corresponding private dataset 123-1, 123-2, 123-n and/or the corresponding shared dataset 127.

In various embodiments, each integration platform 140-1, 140-2, 140-n may be configured to manage the shared dataset 127 and provide features of blockchain technology to system 100. In that regard, integration platforms 140-1, 140-2, 140-n may comprise similar features and functions as a blockchain node. Each integration platform 140-1, 140-2, 140-n may comprise one or more computing devices, such as, for example a computer or processor, or a set of computers, processor, and/or application specific integrated circuits (ASICs), although other types of computing units or system may also be used. Exemplary computing devices may include servers, pooled servers, laptops, notebooks, hand held computers, smart phones (e.g., IPHONE®, BLACKBERRY®, ANDROID®, etc.), tablets, Internet of things (IoT) devices, or any other device capable of receiving data over a network. Each integration platform 140-1, 140-2, 140-n may include one or more processors and/or one or more tangible, non-transitory memories and be capable of implementing logic. The processor may be configured to implement various logical operations in response to execution of instructions, for example, instructions stored on a non-transitory, tangible, computer-readable medium, as discussed further herein. In various embodiments, one or more integration platforms 140-1, 140-2, 140-n may comprise a standalone platform in electronic communication with the corresponding data structure 120-1, 120-2, 120-n. In various embodiments, one or more integration platforms 140-1, 140-2, 140-n may be integrated into the corresponding data structure 120-1, 120-2, 120-n.

In various embodiments, each integration platform 140-1, 140-2, 140-n may be in electronic communication with each other over a peer-to-network (e.g., integration platform 140-1 is in electronic communication with integration platforms 140-2, 140-n; integration platform 140-2 is in electronic communication with integration platforms 140-1, 140-n; integration platform 140-n is in electronic communication with integration platforms 140-1, 140-2; etc.). The integration platforms 140-1, 140-2, 140-n may communicate according to a gossip protocol, or the like, that defines communications amongst computers in the network, manages membership to the network, and controls the broadcast of messages across the network. For example, the gossip protocol may comprise a typical gossip protocol implemented by blockchain technologies.

In various embodiments, each integration platform 140-1, 140-2, 140-n may be in electronic communication with one or more key repositories 150 (e.g., integration platform 140-1 is in communication with key repository 150-1; integration platform 140-2 is in communication with key repository 150-2; integration platform 140-*n* is in communication with key repository 150-*n*; etc.). Each key repository 150-1, 150-2, 150-*n* may comprise any suitable combination of hardware, software, and/or database components. For example, each key repository 150-1, 150-2, 150-*n* may comprise any suitable type of database, data structure, or the like capable of storing one or more cryptographic keys. Each key repository 150-1, 150-2, 150-*n* may be configured to store and maintain cryptographic keys used to digitally sign transactions written to shared dataset 127. In various embodiments, the asymmetric keys may be certificate-based, and issuance of the certificates may be controlled by an external or internal trust authority. For example, each entity system 110-1, 110-2, 110-*n* may register with system 100 and/or an existing trust participant (e.g., identity provider, such as, for example a trusted certificate authority like VeriSign®, DigiCert®, etc.), and may be assigned and provided a private key and public key pair. System 100 may generate the public key and private key pair using any suitable key pair generation technique and asymmetric key algorithm. In various embodiments, system 100 may use a Hierarchical Deterministic (HD) solution to enable the creation of one or more child keys from one or more parents keys in a hierarchy. Each child key may be assigned to an individual entity system 110-1, 110-2, 110-*n*, and/or integration platform 140-1, 140-2, 140-*n*. For example, system 100 may use BIP32, BIP39, and/or BIP44 to generate an HD tree of public addresses. In various embodiments, each entity system 110-1, 110-2, 110-*n* (and/or integration platform 140-1, 140-2, 140-*n*) may also be configured to generate a private key and public key pair. In that respect, the public key may be shared via the peer-to-peer network to each connected entity system 110-1, 110-2, 110-*n*.

Integration platform 140-1, 140-2, 140-*n* may comprise one or more components, modules, or the like configured to aid in managing the shared dataset 127 and providing features of blockchain technology to system 100. Each component, module, or the like may comprise software components installed on the integration platform 140-1, 140-2, 140-*n*. For example, each integration platform 140-1, 140-2, 140-*n* may comprise a cryptography module 142 (e.g., cryptography module 142-1, cryptography module 142-2, cryptography module 142-*n*), a replication module 144 (e.g., replication module 144-1, replication module 144-2, replication module 144-*n*), a consensus module 146 (e.g., consensus module 146-1, consensus module 146-2, consensus module 146-*n*), and/or a mapping module 148 (e.g., mapping module 148-1, mapping module 148-2, mapping module 148-*n*). In various embodiments, integration platforms 140-1, 140-2, 140-*n* may also implement a smart contract configured to control the end-to-end data flow in system 100. In that regard, the smart contract may control steps to write new data blocks in the system.

In various embodiments, cryptography module 142-1, 142-2, 142-*n* may be configured to provide security features to data and transactions written to the shared dataset 127. For example, cryptography module 142-1, 142-2, 142-*n* may be configured to retrieve the entity public key from the corresponding key repository 150-1, 150-2, 150-*n*. Cryptography module 142-1, 142-2, 142-*n* may use the entity public key to digitally sign data and transactions prior to writing the data or transaction to shared dataset 127, as discussed further herein. In various embodiments, the data and/or transaction may also be encrypted, digitally signed, or the like, when written to the shared dataset 127 and may be transmitted over transport level encryption. For example, each cryptography module 142-1, 142-2, 142-*n* may be configured to verify digital signatures, maintain integrity of Merkle tree, verify proof of work, and/or the like, similar to typical blockchain technologies.

In various embodiments, replication module 144-1, 144-2, 144-*n* may be configured to update shared dataset 127. For example, in response to an integration platform 140-1, 140-2, 140-*n* broadcasting a transaction message to other integration platforms 140-1, 140-2, 140-*n* connected to the peer-to-peer network, replication module 144-1, 144-2, 144-*n* may receive the broadcasted transaction message, and write the transaction message to the shared dataset 127, as discussed further herein. In various embodiments, replication module 144-1, 144-2, 144-*n* may be configured to use mapping module 148-1, 148-2, 148-*n* to aid in writing the transaction message to the shared dataset 127. In that regard, mapping module 148-1, 148-2, 148-*n* may be configured to enable each integration platform 140-1, 140-2, 140-*n* to write the transaction message to data structures 120-1, 120-2, 120-*n* having different structures, formats, and protocols. For example, mapping module 148-1, 148-2, 148-*n* may comprise an internal data model comprising a data field mapping for each known data structure used in system 100. For example, the internal data model may store a mapping of data fields used in each known database structure and data, metadata, or the like indicating which data fields in a first data structure correspond to data fields in a second data structure. In that respect, the internal data model may enable mapping module 148-1, 148-2, 148-*n* to reformat the transaction message into a data format that can be stored in the data structure 120-1, 120-2, 120-*n*. In various embodiments, replication module 144-1, 144-2, 144-*n* may be configured to invoke mapping module 148-1, 148-2, 148-*n* based on the smart contract, such as, for example, in response to a determination that the data format of the transaction message is different than the data format used in the corresponding data structure 120-1, 120-2, 120-*n*.

In various embodiments, consensus module 146-1, 146-2, 146-*n* may be configured to enable gossip between each integration platform 140-1, 140-2, 140-*n* to reach consensus on transaction messages to be written to shared dataset 127. Consensus modules 146-1, 146-2, 146-*n* may be configured to reach consensus on a transaction message (e.g., a dataset update request, etc.) using any suitable or desired consensus method or algorithm, such as, for example, proof of work, proof of stake, practical byzantine fault tolerance, delegated proof of stake, or any other suitable consensus algorithm. In various embodiments, consensus module 146-1, 146-2, 146-*n* may also need consensus from each consensus module 146-1, 146-2, 146-*n* connected in the peer-to-peer network before consenting to the transaction message.

Figure 2:
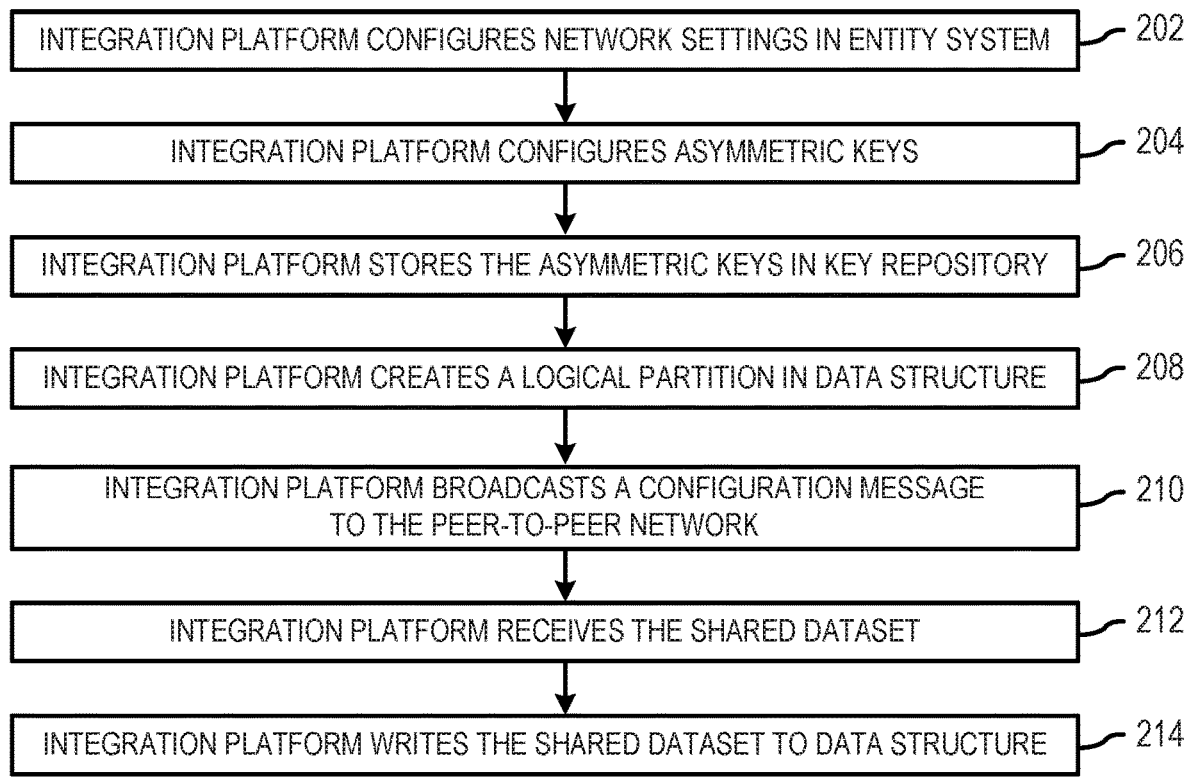
FIG. 2 illustrates a process flow for onboarding an integration platform for shared blockchain-enabled datasets, in accordance with various embodiments.
Figure 3:
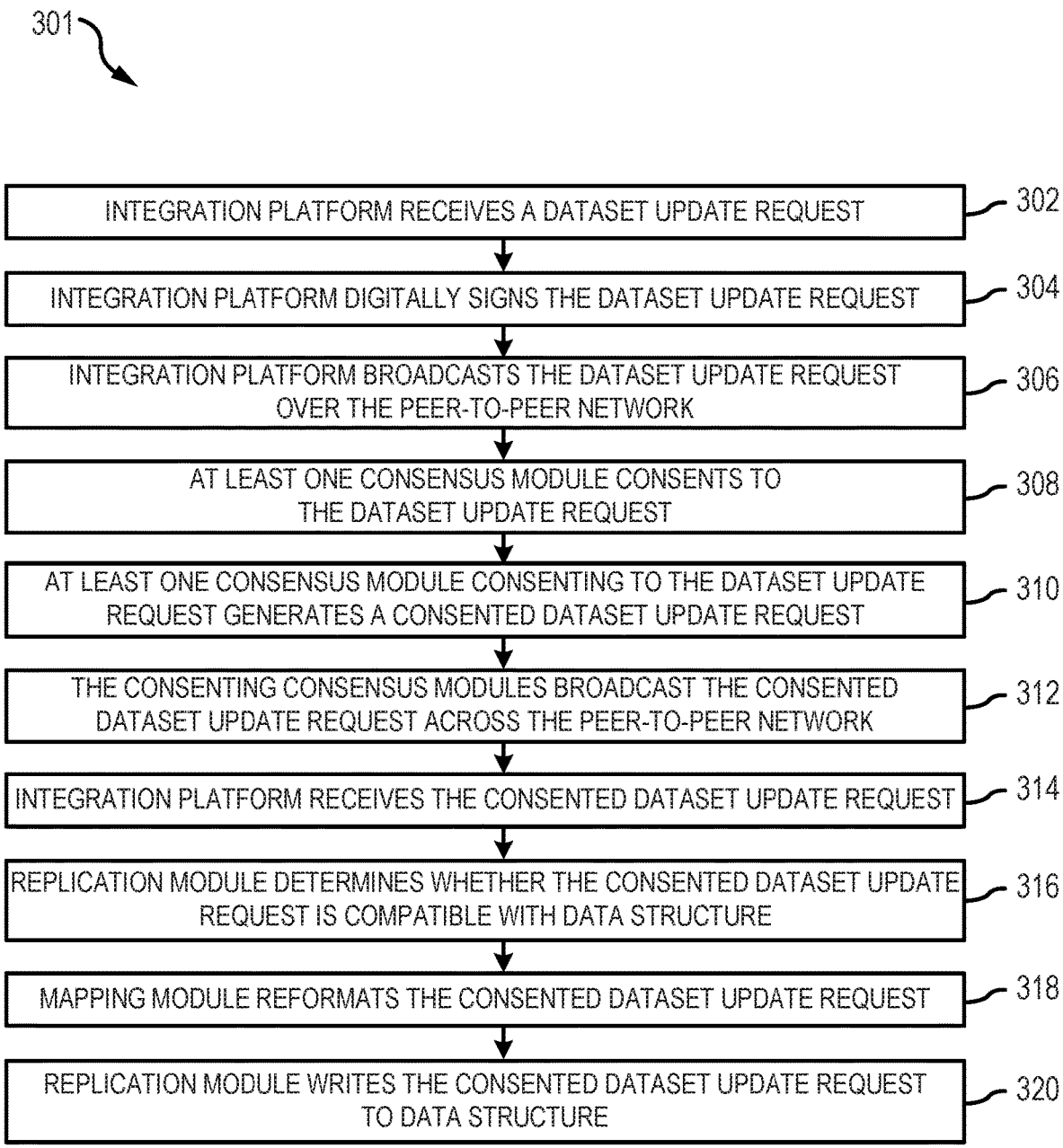
FIG. 3 illustrates a process flow for updating data in the shared blockchain-enabled dataset, in accordance with various embodiments.

Referring now to FIGS. 2 and 3, the process flows depicted are merely embodiments and are not intended to limit the scope of the disclosure. For example, the steps recited in any of the method or process descriptions may be executed in any order and are not limited to the order presented. It will be appreciated that the following description makes appropriate references not only to the steps depicted in FIGS. 2 and 3, but also to the various system components as described above with reference to FIG. 1.

With specific reference to FIG. 2, a method 201 for onboarding an integration platform for shared datasets is shown, according to various embodiments. In various embodiments, integration platform 140-1, 140-2, 140-*n* may be initially installed on a dedicated server, computer-based system, or the like. Integration platform 140-1, 140-2, 140-*n* may also be integrated into the corresponding data structure 120-1, 120-2, 120-*n*, and may be initially setup during configuration of the data structure 120-1, 120-2, 120-*n*. In various embodiments, initial setup, installation, configuration, or the like may vary and be completed using any suitable technique. For example, participation in the system may be limited based on a defined list of X.509 certificates (wherein certificates are generated for new entities joining system 100), may be restricted based on a private network configuration, may be restricted based on issued blockchain addresses, or the like. In various embodiments, system 100 may also implement smart contracts configured to control access to the system.

In various embodiments, integration platform 140-1, 140-2, 140-*n* configures network settings in entity system 110-1, 110-2, 110-*n* (step 202), to enable peer-to-peer communications using a gossip protocol. For example, integration platform 140-1, 140-2, 140-*n* may configure firewall settings, network protocol settings, and the like to allow integration platform 140-1, 140-2, 140-*n* to communicate over a peer-to-peer network. Integration platform 140-1, 140-2, 140-*n* may broadcast a registration communication across the peer-to-peer network to initiate communications amongst the other integration platforms 140-1, 140-2, 140-*n* connected to the network. Integration platform 140-1, 140-2, 140-*n* configures asymmetric keys (step 204). For example, integration platform 140-1, 140-2, 140-*n* may generate a private key and public key. As a further example, integration platform 140-1, 140-2, 140-*n* may register with system 100 and/or an existing trust participant (e.g., identity provider, such as, for example a trusted certificate authority like VeriSign®, DigiCert®, etc.), and may be assigned and provided a private key and public key pair. Integration platform 140-1, 140-2, 140-*n* stores the asymmetric keys in key repository 150-1, 150-2, 150-*n* (step 206).

In various embodiments, integration platform 140-1, 140-2, 140-*n* creates a logical partition in data structure 120-1, 120-2, 120-*n* (step 208). For example, integration platform 140-1, 140-2, 140-*n* may transmit instructions to data structure 120-1, 120-2, 120-*n* to create a logical partition of the available database. The instructions may define the size of the logical partition (e.g., 500 MB, 5 GB, 100 GB, etc.), and/or any other desired properties. In response to receiving the instructions, data structure 120-1, 120-2, 120-*n* may logically partition the database such that there is at least one private dataset 123-1, 123-2, 123-*n* and at least one partition available for storing a shared dataset 127.

Integration platform 140-1, 140-2, 140-*n* may broadcast a configuration message to the peer-to-peer network (step 210), using the gossip protocol. The configuration message may comprise data a request to receive the shared dataset 127. Integration platform 140-1, 140-2, 140-*n* receives the shared dataset 127 (step 212) from at least one other integration platform 140-1, 140-2, 140-*n* connected to the peer-to-peer network. In various embodiments, integration platforms 140-1, 140-2, 140-*n* may establish a consensus to add a new entity system. For example, consensus may be controlled by a smart contract or the like defining the number of integration platforms 140-1, 140-2, 140-*n* that must agree in order to add a new entity system. In various embodiments, one or more integration platforms 140-1, 140-2, 140-*n* may also be designated as an administrator and may be configured to control membership and/or participation in the network. Integration platform 140-1, 140-2, 140-*n* may also receive back consensus configuration settings such as, for example, the type of consensus method or algorithm being used by system 100. Integration platform 140-1, 140-2, 140-*n* writes the shared dataset to data structure 120-1, 120-2, 120-*n* (step 214). Integration platform 140-1, 140-2, 140-*n* may write the shared dataset to the logically partitioned section of data structure 120-1, 120-2, 120-*n* created during step 208. In various embodiments, integration platform 140-1, 140-2, 140-*n* may invoke mapping module 148-1, 148-2, 148-*n* to reformat the shared dataset into a format storable in data structure 120-1, 120-2, 120-*n*. In that respect, mapping module 148-1, 148-2, 148-*n* may reformat the data fields in the shared dataset to correspond to data fields specified by data structure 120-1, 120-2, 120-*n*.

With specific reference to FIG. 3, a method 301 for updating data in a shared dataset is shown, according to various embodiments. Method 301 may be controlled using a smart contract stored in each integration platform 140-1, 140-2, 140-*n*. For example, each integration platform 140-1, 140-2, 140-*n* may comprise a single smart contract configured to control the data flow for every update to shared dataset 127. Each integration platform 140-1, 140-2, 140-*n* may also comprise a plurality of smart contracts, with each smart contract configured to control the data flow for different updates to shared dataset 127 (e.g., a write smart contract, an update smart contract, and/or smart contracts corresponding to specific data entries that are updated).

Integration platform 140-1, 140-2, 140-*n* receives a dataset update request (step 302). In various embodiments, the dataset update request may be manually generated and sent by an entity system. In various embodiments, each integration platform 140-1, 140-2, 140-*n* may also be configured to determine that an update has been made to the shared dataset 127, and may generate the dataset update request. For example, each integration platform 140-1, 140-2, 140-*n* may implement a blockchain software development kit (SDK), event oracle, event subscription API or the like configured to monitor each shared dataset 127 and generate a dataset update request in response to determining that an update, write, or the like has been made to the shared dataset 127. The dataset update request may comprise a request to update data in shared dataset 127, write new data to shared dataset 127, or the like. In that respect, the dataset update request may also comprise data indicating the information to be written to shared dataset 127, the data to be updated in shared dataset 127, and/or the like.

In various embodiments, integration platform 140-1, 140-2, 140-*n* digitally signs the dataset update request (step 304) using an entity public key. For example, cryptography module 142-1, 142-2, 142-*n* may retrieve the entity public key from key repository 150-1, 150-2, 150-*n*. Cryptography module 142-1, 142-2, 142-*n* may use the private key to digitally sign the dataset update request. In various embodiments, integration platform 140-1, 140-2, 140-*n* may also be configured to perform any other suitable integration on the dataset update request.

Integration platform 140-1, 140-2, 140-*n* may broadcast the dataset update request across the peer-to-peer network (step 306) to at least one other integration platform 140-1, 140-2, 140-*n* in the peer-to-peer network. For example, consensus module 146-1, 146-2, 146-*n* may be configured to broadcast the dataset update request to at least one other consensus module 146-1, 146-2, 146-*n* using the gossip protocol. Consensus module 146-1, 146-2, 146-*n* may broadcast the dataset update request to any number of other consensus modules 146-1, 146-2, 146-*n*, which may be defined by the consensus method or algorithm used by the consensus module 146-1, 146-2, 146-*n*. In various embodiments, consensus module 146-1, 146-2, 146-*n* may be configured to broadcast the dataset update request using a secure channel.

At least one consensus module 146-1, 146-2, 146-*n* consents to the dataset update request (step 308) based on the consensus method or algorithm. For example, consensus modules 146-1, 146-2, 146-*n* may be configured to reach a consensus on the dataset update request using proof of work, proof of stake, practical byzantine fault tolerance, delegated proof of stake, or any other suitable consensus algorithm. The consensus algorithm or method may define a process used to achieve agreement on whether the dataset update request should be allowed to modify or add data to shared dataset 127. In that respect, consensus algorithms may allow mutually untrusted, uncoordinated entity systems to agree on data to be added or modified in shared dataset 127. In response to at least one consensus module 146-1, 146-2, 146-*n* consenting to the dataset update request, based on the consensus method or algorithm, the consensus module 146-1, 146-2, 146-*n* generates a consented dataset update request (step 310). The consenting consensus modules 146-1, 146-2, 146-*n* broadcast the consented dataset update request across the peer-to-peer network (step 312).

Integration platform 140-1, 140-2, 140-*n* receives the consented dataset update request (step 314) from the peer-to-peer network and via the corresponding consensus module 146-1, 146-2, 146-*n*. In response to receiving the consented dataset update request, replication module 144-1, 144-2, 144-*n* determines whether the consented dataset update request is compatible with data structure 120-1, 120-2, 120-3 (step 316). For example, the consented dataset update request may comprise metadata or the like that identifies the data format the request was written in and/or the database type that the request is compatible with. As a further example, replication module 144-1, 144-2, 144-*n* may parse the consented dataset update request to determine the data fields contained therein, and may compare the data fields against data fields used in data structure 120-1, 120-2, 120-*n* to determine compatibility.

In various embodiments, in response to determining that the consented dataset update request is not in a format compatible with data structure 120-1, 120-2, 120-*n*, mapping module 148-1, 148-2, 148-*n* may reformat the consented dataset update request (step 318) into a format compatible with data structure 120-1, 120-2, 120-*n*. For example, mapping module 148-1, 148-2, 148-*n* may comprise an internal data model comprising a data field mapping for each known data structure used in system 100. For example, the internal data model may store a mapping of data fields used in each known database structure and data, metadata, or the like indicating which data fields in a first data structure correspond to data fields in a second data structure. In that respect, the internal data model may enable mapping module 148-1, 148-2, 148-*n* to reformat the consented dataset update request into a data format that can be stored in the data structure 120-1, 120-2, 120-*n*. In various embodiments, replication module 144-1, 144-2, 144-*n* may write the consented dataset update request to shared dataset 127 (step 320). In that regard, the consented dataset update request may be written to each shared dataset in system 100 such that all shared datasets stored in data structures 120-1, 120-2, 120-*n* are updated with the consented to data.

Systems, methods and computer program products are provided. In the detailed description herein, references to "various embodiments," "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

As used herein, "satisfy," "meet," "match," "associated with" or similar phrases may include an identical match, a partial match, meeting certain criteria, matching a subset of data, a correlation, satisfying certain criteria, a correspondence, an association, an algorithmic relationship and/or the like. Similarly, as used herein, "authenticate" or similar terms may include an exact authentication, a partial authentication, authenticating a subset of data, a correspondence, satisfying certain criteria, an association, an algorithmic relationship and/or the like.

The computer system (e.g., entity system 110-1, 110-2, or 110-*n*) or any components therein may integrate with system integration technology such as, for example, the ALEXA system developed by AMAZON®. ALEXA is a cloud-based voice service that can help you with tasks, entertainment, general information and more. All AMAZON® ALEXA devices, such as the AMAZON ECHO®, AMAZON ECHO DOT®, AMAZON TAP®, and AMAZON FIRE® TV, have access to the ALEXA system. The ALEXA system may receive voice commands via its voice activation technology, and activate other functions, control smart devices and/or gather information. For example, music, emails, texts, calling, questions answered, home improvement information, smart home communication/activation, games, shopping, making to-do lists, setting alarms, streaming podcasts, playing audiobooks, and providing weather, traffic, and other real time information, such as news. The ALEXA system may allow the user to access information about eligible accounts linked to an online account across all ALEXA-enabled devices.

Any communication, transmission and/or channel discussed herein may include any system or method for delivering content (e.g. data, information, metadata, etc.), and/or the content itself. The content may be presented in any form or medium, and in various embodiments, the content may be delivered electronically and/or capable of being presented electronically. For example, a channel may comprise a website or device (e.g., Facebook, YOUTUBE®, APPLE®TV®, PANDORA®, XBOX®, SONY® PLAYSTATION®), a uniform resource locator ("URL"), a document (e.g., a MICROSOFT® Word® document, a MICROSOFT® Excel® document, an ADOBE® .pdf document, etc.), an "ebook," an "emagazine," an application or microapplication (as described herein), an SMS or other type of text message, an email, a FACEBOOK® message, a TWITTER® tweet, MMS and/or other type of communication technology. In various embodiments, a channel may be hosted or provided by a data partner. In various embodiments, the distribution channel may comprise at least one of a merchant website, a social media website, affiliate or partner websites, an external vendor, a mobile device communication, social media network and/or location based service. Distribution channels may include at least one of a merchant website, a social media site, affiliate or partner websites, an external vendor, and a mobile device communication. Examples of social media sites include FACEBOOK®, FOURSQUARE®, TWITTER®, MYSPACE®, LINKEDIN®, and the like. Examples of affiliate or partner websites include AMERICAN EXPRESS®, GROUPON®, LIVINGSOCIAL®, and the like. Moreover, examples of mobile device communications include texting, email, and mobile applications for smartphones.

In various embodiments, the methods described herein are implemented using the various particular machines described herein. The methods described herein may be implemented using the below particular machines, and those hereinafter developed, in any suitable combination, as would be appreciated immediately by one skilled in the art. Further, as is unambiguous from this disclosure, the methods described herein may result in various transformations of certain articles.

For the sake of brevity, conventional data networking, application development and other functional aspects of the systems (and components of the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the system. As those skilled in the art will appreciate, user computer may include an operating system (e.g., WINDOWS®, OS2, UNIX®, LINUX®, SOLARIS®, MacOS, etc.) as well as various conventional support software and drivers typically associated with computers.

The present system or any part(s) or function(s) thereof may be implemented using hardware, software or a combination thereof and may be implemented in one or more computer systems or other processing systems. However, the manipulations performed by embodiments were often referred to in terms, such as matching or selecting, which are commonly associated with mental operations performed by a human operator. No such capability of a human operator is necessary, or desirable in most cases, in any of the operations described herein. Rather, the operations may be machine operations or any of the operations may be conducted or enhanced by Artificial Intelligence (AI) or Machine Learning. Useful machines for performing the various embodiments include general purpose digital computers or similar devices.

In fact, and in accordance with various embodiments, the embodiments are directed toward one or more computer systems capable of carrying out the functionality described herein. The computer system includes one or more processors, such as processor. The processor is connected to a communication infrastructure (e.g., a communications bus, cross over bar, or network). Various software embodiments are described in terms of this exemplary computer system.

After reading this description, it will become apparent to a person skilled in the relevant art(s) how to implement various embodiments using other computer systems and/or architectures. Computer system can include a display interface that forwards graphics, text, and other data from the communication infrastructure (or from a frame buffer not shown) for display on a display unit.

Computer system also includes a main memory, such as for example random access memory (RAM), and may also include a secondary memory or in-memory (non-spinning) hard drives. The secondary memory may include, for example, a hard disk drive and/or a removable storage drive, representing a floppy disk drive, a magnetic tape drive, an optical disk drive, etc. The removable storage drive reads from and/or writes to a removable storage unit in a well-known manner. Removable storage unit represents a floppy disk, magnetic tape, optical disk, etc. which is read by and written to by removable storage drive. As will be appreciated, the removable storage unit includes a computer usable storage medium having stored therein computer software and/or data.

In various embodiments, secondary memory may include other similar devices for allowing computer programs or other instructions to be loaded into computer system. Such devices may include, for example, a removable storage unit and an interface. Examples of such may include a program cartridge and cartridge interface (such as that found in video game devices), a removable memory chip (such as an erasable programmable read only memory (EPROM), or programmable read only memory (PROM)) and associated socket, and other removable storage units and interfaces, which allow software and data to be transferred from the removable storage unit to computer system.

Computer system may also include a communications interface. Communications interface allows software and data to be transferred between computer system and external devices. Examples of communications interface may include a modem, a network interface (such as an Ethernet card), a communications port, a Personal Computer Memory Card International Association (PCMCIA) slot and card, etc. Software and data files transferred via communications interface are in the form of signals which may be electronic, electromagnetic, optical or other signals capable of being received by communications interface. These signals are provided to communications interface via a communications path (e.g., channel). This channel carries signals and may be implemented using wire, cable, fiber optics, a telephone line, a cellular link, a radio frequency (RF) link, wireless and other communications channels.

The terms "computer program medium" and "computer usable medium" and "computer readable medium" are used to generally refer to media such as removable storage drive and a hard disk installed in hard disk drive. These computer program products provide software to computer system.

Computer programs (also referred to as computer control logic) are stored in main memory and/or secondary memory. Computer programs may also be received via communications interface. Such computer programs, when executed, enable the computer system to perform the features as discussed herein. In particular, the computer programs, when executed, enable the processor to perform the features of various embodiments. Accordingly, such computer programs represent controllers of the computer system.

In various embodiments, software may be stored in a computer program product and loaded into computer system using removable storage drive, hard disk drive or communications interface. The control logic (software), when executed by the processor, causes the processor to perform the functions of various embodiments as described herein. In various embodiments, hardware components such as application specific integrated circuits (ASICs). Implementation of the hardware state machine so as to perform the functions described herein will be apparent to persons skilled in the relevant art(s).

In various embodiments, the server may include application servers (e.g. WEBSPHERE®, WEBLOGIC®, MOSS®, EDB® POSTGRES PLUS ADVANCED SERVER® (PPAS), etc.). In various embodiments, the server may include web servers (e.g. APACHE®, IIS, GWS, SUN JAVA® SYSTEM WEB SERVER, JAVA® Virtual Machine running on LINUX® or WINDOWS®).

A web client includes any device (e.g., personal computer) which communicates via any network, for example such as those discussed herein. Such browser applications comprise Internet browsing software installed within a computing unit or a system to conduct online transactions and/or communications. These computing units or systems may take the form of a computer or set of computers, although other types of computing units or systems may be used, including laptops, notebooks, tablets, hand held computers, personal digital assistants, set-top boxes, workstations, computer-servers, main frame computers, mini-computers, PC servers, pervasive computers, network sets of computers, personal computers, such as IPADS®, IMACS®, and MACBOOKS®, kiosks, terminals, point of sale (POS) devices and/or terminals, televisions, or any other device capable of receiving data over a network. A web-client may run MICROSOFT® INTERNET EXPLORER®, MOZILLA® FIREFOX®, GOOGLE® CHROME®, APPLE® Safari, or any other of the myriad software packages available for browsing the internet.

As those skilled in the art will appreciate that a web client may or may not be in direct contact with an application server. For example, a web client may access the services of an application server through another server and/or hardware component, which may have a direct or indirect connection to an Internet server. For example, a web client may communicate with an application server via a load balancer. In various embodiments, access is through a network or the Internet through a commercially-available web-browser software package.

As those skilled in the art will appreciate, a web client includes an operating system (e.g., WINDOWS® OS, OS2, UNIX® OS, LINUX® OS, SOLARIS®, MacOS, and/or the like) as well as various conventional support software and drivers typically associated with computers. A web client may include any suitable personal computer, network computer, workstation, personal digital assistant, cellular phone, smart phone, minicomputer, mainframe or the like. A web client can be in a home or business environment with access to a network. In various embodiments, access is through a network or the Internet through a commercially available web-browser software package. A web client may implement security protocols such as Secure Sockets Layer (SSL) and Transport Layer Security (TLS). A web client may implement several application layer protocols including http, https, ftp, and sftp.

In various embodiments, components, modules, and/or engines of system 100 may be implemented as micro-applications or micro-apps. Micro-apps are typically deployed in the context of a mobile operating system, including for example, a WINDOWS® mobile operating system, an ANDROID® operating system, APPLE® IOS®, a BLACKBERRY® operating system and the like. The micro-app may be configured to leverage the resources of the larger operating system and associated hardware via a set of predetermined rules which govern the operations of various operating systems and hardware resources. For example, where a micro-app desires to communicate with a device or network other than the mobile device or mobile operating system, the micro-app may leverage the communication protocol of the operating system and associated device hardware under the predetermined rules of the mobile operating system. Moreover, where the micro-app desires an input from a user, the micro-app may be configured to request a response from the operating system which monitors various hardware components and then communicates a detected input from the hardware to the micro-app.

As used herein an "identifier" may be any suitable identifier that uniquely identifies an item. For example, the identifier may be a globally unique identifier ("GUID"). The GUID may be an identifier created and/or implemented under the universally unique identifier standard. Moreover, the GUID may be stored as 128-bit value that can be displayed as 32 hexadecimal digits. The identifier may also include a major number, and a minor number. The major number and minor number may each be 16 bit integers Any databases discussed herein may include relational, hierarchical, graphical, blockchain, or object-oriented structure and/or any other database configurations. Any database may also include a flat file structure wherein data may be stored in a single file in the form of rows and columns, with no structure for indexing and no structural relationships between records. For example, a flat file structure may include a delimited text file, a CSV (comma-separated values) file, and/or any other suitable flat file structure. Common database products that may be used to implement the databases include DB2 by IBM® (Armonk, N.Y.), various database products available from ORACLE® Corporation (Redwood Shores, Calif.), MICROSOFT ACCESS® or MICROSOFT SQL SERVER® by MICROSOFT® Corporation (Redmond, Wash.), MySQL by MySQL AB (Uppsala, Sweden), MONGODB®, REDIS®, APACHE CASSANDRA®, HBase by APACHE®, MapR-DB, or any other suitable database product. Moreover, the databases may be organized in any suitable manner, for example, as data tables or lookup tables. Each record may be a single file, a series of files, a linked series of data fields or any other data structure.

Any database discussed herein may comprise a distributed ledger maintained by a plurality of computing devices (e.g., nodes) over a peer-to-peer network. Each computing device maintains a copy and/or partial copy of the distributed ledger and communicates with one or more other computing devices in the network to validate and write data to the distributed ledger. The distributed ledger may use features and functionality of blockchain technology, including, for example, consensus based validation, immutability, and cryptographically chained blocks of data. The blockchain may comprise a ledger of interconnected blocks containing data. The blockchain may provide enhanced security because each block may hold individual transactions and the results of any blockchain executables. Each block may link to the previous block and may include a timestamp. Blocks may be linked because each block may include the hash of the prior block in the blockchain. The linked blocks form a chain, with only one successor block allowed to link to one other predecessor block for a single chain. Forks may be possible where divergent chains are established from a previously uniform blockchain, though typically only one of the divergent chains will be maintained as the consensus chain. In various embodiments, the blockchain may implement smart contracts that enforce data workflows in a decentralized manner. The system may also include applications deployed on user devices such as, for example, computers, tablets, smartphones, Internet of Things devices ("IoT" devices), etc. The applications may communicate with the blockchain (e.g., directly or via a blockchain node) to transmit and retrieve data. In various embodiments, a governing organization or consortium may control access to data stored on the blockchain. Registration with the managing organization(s) may enable participation in the blockchain network.

Data transfers performed through the blockchain-based system may propagate to the connected peers within the blockchain network within a duration that may be determined by the block creation time of the specific blockchain technology implemented. For example, on an ETHEREUM®-based network, a new data entry may become available within about 13-20 seconds as of the writing. On a Hyperledger® Fabric 1.0 based platform, the duration is driven by the specific consensus algorithm that is chosen, and may be performed within seconds. In that respect, propagation times in the system may be improved compared to existing systems, and implementation costs and time to market may also be drastically reduced. The system also offers increased security at least partially due to the immutable nature of data that is stored in the blockchain, reducing the probability of tampering with various data inputs and outputs. Moreover, the system may also offer increased security of data by performing cryptographic processes on the data prior to storing the data on the blockchain. Therefore, by transmitting, storing, and accessing data using the system described herein, the security of the data is improved, which decreases the risk of the computer or network from being compromised.

In various embodiments, the blockchain database may also reduce database synchronization errors by providing a common data structure, thus at least partially improving the integrity of stored data. The blockchain database also offers increased reliability and fault tolerance over traditional databases (e.g., relational databases, distributed databases, etc.) as each node operates with a full copy of the stored data, thus at least partially reducing downtime due to localized network outages and hardware failures. The blockchain database may also increase the reliability of data transfers in a network environment having reliable and unreliable peers, as each node broadcasts messages to all connected peers, and, as each block comprises a link to a previous block, a node may quickly detect a missing block and propagate a request for the missing block to the other nodes in the blockchain network. For more information on distributed ledgers implementing features and functionalities of blockchain, see U.S. application Ser. No. 15/266,350 titled SYSTEMS AND METHODS FOR BLOCKCHAIN BASED PAYMENT NETWORKS and filed on Sep. 15, 2016, U.S. application Ser. No. 15/682,180 titled SYSTEMS AND METHODS FOR DATA FILE TRANSFER BALANCING AND CONTROL ON BLOCKCHAIN and filed Aug. 21, 2017, U.S. application Ser. No. 15/728,086 titled SYSTEMS AND METHODS FOR LOYALTY POINT DISTRIBUTION and filed Oct. 9, 2017, U.S. application Ser. No. 15/785,843 titled MESSAGING BALANCING AND CONTROL ON BLOCKCHAIN and filed on Oct. 17, 2017, U.S. application Ser. No. 15/785,870 titled API REQUEST AND RESPONSE BALANCING AND CONTROL ON BLOCKCHAIN and filed on Oct. 17, 2017, U.S. application Ser. No. 15/824,450 titled SINGLE SIGN-ON SOLUTION USING BLOCKCHAIN and filed on Nov. 28, 2017, U.S. application Ser. No. 15/824,513 titled TRANSACTION AUTHORIZATION PROCESS USING BLOCKCHAIN and filed on Nov. 28, 2017, U.S. application Ser. No. 15/943,168 titled TRANSACTION PROCESS USING BLOCKCHAIN TOKEN SMART CONTRACTS and filed on Apr. 2, 2018, and U.S. application Ser. No. 15/943,271 titled FRAUD MANAGEMENT USING A DISTRIBUTED DATABASE and filed on Apr. 2, 2018, the contents of which are each incorporated by reference in its entirety.

Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors. Various database tuning steps are contemplated to optimize database performance. For example, frequently used files such as indexes may be placed on separate file systems to reduce In/Out ("I/O") bottlenecks.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one embodiment, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In various embodiments, the ability to store a wide variety of information in different formats is facilitated by storing the information as a BLOB. Thus, any binary information can be stored in a storage space associated with a data set. As discussed above, the binary information may be stored in association with the system or external to but affiliated with system. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data, in the database or associated with the system, by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments, the data can be stored without regard to a common format. However, the data set (e.g., BLOB) may be annotated in a standard manner when provided for manipulating the data in the database or system. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set: e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a standalone interaction device configured to add, delete, modify, or augment the data in accordance with the header or trailer. As such, in one embodiment, the header or trailer is not stored on the transaction device along with the associated issuer-owned data but instead the appropriate action may be taken by providing to the user at the standalone device, the appropriate option for the action to be taken. The system may contemplate a data storage arrangement wherein the header or trailer, or header or trailer history, of the data is stored on the system, device, or transaction instrument in relation to the appropriate data.

One skilled in the art will also appreciate that, for security reasons, any databases, systems, devices, servers or other components of the system may consist of any combination thereof at a single location or at multiple locations, wherein each database or system includes any of various suitable security features, such as firewalls, access codes, encryption, decryption, compression, decompression, and/or the like.

Encryption may be performed by way of any of the techniques now available in the art or which may become available—e.g., Twofish, RSA, El Gamal, Schorr signature, DSA, PGP, PM, GPG (GnuPG), HPE Format-Preserving Encryption (FPE), Voltage, and symmetric and asymmetric cryptosystems. The systems and methods may also incorporate SHA series cryptographic methods as well as ECC (Elliptic Curve Cryptography) and other Quantum Readable Cryptography Algorithms under development.

The computing unit of the web client may be further equipped with an Internet browser connected to the Internet or an intranet using standard dial-up, cable, DSL or any other Internet protocol known in the art. Transactions originating at a web client may pass through a firewall in order to prevent unauthorized access from users of other networks. Further, additional firewalls may be deployed between the varying components of CMS to further enhance security.

Firewall may include any hardware and/or software suitably configured to protect CMS components and/or enterprise computing resources from users of other networks. Further, a firewall may be configured to limit or restrict access to various systems and components behind the firewall for web clients connecting through a web server. Firewall may reside in varying configurations including Stateful Inspection, Proxy based, access control lists, and Packet Filtering among others. Firewall may be integrated within a web server or any other CMS components or may further reside as a separate entity. A firewall may implement network address translation ("NAT") and/or network address port translation ("NAPE"). A firewall may accommodate various tunneling protocols to facilitate secure communications, such as those used in virtual private networking. A firewall may implement a demilitarized zone ("DMZ") to facilitate communications with a public network such as the Internet. A firewall may be integrated as software within an Internet server, any other application server components or may reside within another computing device or may take the form of a standalone hardware component.

The computers discussed herein may provide a suitable website or other Internet-based graphical user interface which is accessible by users. In one embodiment, the MICROSOFT® INTERNET INFORMATION SERVICES® (IIS), MICROSOFT® Transaction Server (MTS), and MICROSOFT® SQL Server, are used in conjunction with the MICROSOFT® operating system, MICROSOFT® NT web server software, a MICROSOFT® SQL Server database system, and a MICROSOFT® Commerce Server. Additionally, components such as Access or MICROSOFT® SQL Server, ORACLE®, Sybase, Informix MySQL, Interbase, etc., may be used to provide an Active Data Object (ADO) compliant database management system. In one embodiment, the Apache web server is used in conjunction with a Linux operating system, a MySQL database, and the Perl, PHP, Ruby, and/or Python programming languages.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, JAVA® applets, JAVASCRIPT®, active server pages (ASP), common gateway interface scripts (CGI), extensible markup language (XML), dynamic HTML, cascading style sheets (CSS), AJAX (Asynchronous JAVASCRIPT® And XML), helper applications, plug-ins, and the like. A server may include a web service that receives a request from a web server, the request including a URL and an IP address (e.g., 10.0.0.2). The web server retrieves the appropriate web pages and sends the data or applications for the web pages to the IP address. Web services are applications that are capable of interacting with other applications over a communications means, such as the internet. Web services are typically based on standards or protocols such as XML, SOAP, AJAX, WSDL and UDDI. Web services methods are well known in the art, and are covered in many standard texts. For example, representational state transfer (REST), or RESTful, web services may provide one way of enabling interoperability between applications.

Middleware may include any hardware and/or software suitably configured to facilitate communications and/or process transactions between disparate computing systems. Middleware components are commercially available and known in the art. Middleware may be implemented through commercially available hardware and/or software, through custom hardware and/or software components, or through a combination thereof. Middleware may reside in a variety of configurations and may exist as a standalone system or may be a software component residing on the Internet server. Middleware may be configured to process transactions between the various components of an application server and any number of internal or external systems for any of the purposes disclosed herein. WEBSPHERE® MQ™ (formerly MQSeries) by IBM®, Inc. (Armonk, N.Y.) is an example of a commercially available middleware product. An Enterprise Service Bus ("ESB") application is another example of middleware.

Practitioners will also appreciate that there are a number of methods for displaying data within a browser-based document. Data may be represented as standard text or within a fixed list, scrollable list, drop-down list, editable text field, fixed text field, popup window, and the like. Likewise, there are a number of methods available for modifying data in a web page such as, for example, free text entry using a keyboard, selection of menu items, check boxes, option boxes, and the like.

The system and method may be described herein in terms of functional block components, screen shots, optional selections and various processing steps. It should be appreciated that such functional blocks may be realized by any number of hardware and/or software components configured to perform the specified functions. For example, the system may employ various integrated circuit components, e.g., memory elements, processing elements, logic elements, look-up tables, and the like, which may carry out a variety of functions under the control of one or more microprocessors or other control devices. Similarly, the software elements of the system may be implemented with any programming or scripting language such as C, C++, C #, JAVA®, JAVASCRIPT, JAVASCRIPT Object Notation (JSON), VBScript, Macromedia Cold Fusion, COBOL, MICROSOFT® Active Server Pages, assembly, PERL, PHP, awk, Python, Visual Basic, SQL Stored Procedures, PL/SQL, any UNIX shell script, and extensible markup language (XML) with the various algorithms being implemented with any combination of data structures, objects, processes, routines or other programming elements. Further, it should be noted that the system may employ any number of conventional techniques for data transmission, signaling, data processing, network control, and the like. Still further, the system could be used to detect or prevent security issues with a client-side scripting language, such as JAVASCRIPT, VBScript or the like. Cryptography and network security methods are well known in the art, and are covered in many standard texts.

In various embodiments, the software elements of the system may also be implemented using Node.js®. Node.js® may implement several modules to handle various core functionalities. For example, a package management module, such as Npm®, may be implemented as an open source library to aid in organizing the installation and management of third-party Node.js® programs. Node.js® may also implement a process manager, such as, for example, Parallel Multithreaded Machine ("PM2"); a resource and performance monitoring tool, such as, for example, Node Application Metrics ("appmetrics"); a library module for building user interfaces, such as for example ReachJS®, and/or any other suitable and/or desired module.

As will be appreciated by one of ordinary skill in the art, the system may be embodied as a customization of an existing system, an add-on product, a processing apparatus executing upgraded software, a standalone system, a distributed system, a method, a data processing system, a device for data processing, and/or a computer program product. Accordingly, any portion of the system or a module may take the form of a processing apparatus executing code, an internet based embodiment, an entirely hardware embodiment, or an embodiment combining aspects of the internet, software and hardware. Furthermore, the system may take the form of a computer program product on a computer-readable storage medium having computer-readable program code means embodied in the storage medium. Any suitable computer-readable storage medium may be utilized, including hard disks, CD-ROM, BLU-RAY, optical storage devices, magnetic storage devices, and/or the like.

The system and method is described herein with reference to screen shots, block diagrams and flowchart illustrations of methods, apparatus (e.g., systems), and computer program products according to various embodiments. It will be understood that each functional block of the block diagrams and the flowchart illustrations, and combinations of functional blocks in the block diagrams and flowchart illustrations, respectively, can be implemented by computer program instructions.

Referring now to FIGS. 2 and 3, the process flows and screenshots depicted are merely embodiments and are not intended to limit the scope of the disclosure. For example, the steps recited in any of the method or process descriptions may be executed in any order and are not limited to the order presented.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions. Further, illustrations of the process flows and the descriptions thereof may make reference to user WINDOWS®, webpages, websites, web forms, prompts, etc. Practitioners will appreciate that the illustrated steps described herein may comprise in any number of configurations including the use of WINDOWS®, webpages, web forms, popup WINDOWS®, prompts and the like. It should be further appreciated that the multiple steps as illustrated and described may be combined into single webpages and/or WINDOWS® but have been expanded for the sake of simplicity. In other cases, steps illustrated and described as single process steps may be separated into multiple webpages and/or WINDOWS® but have been combined for simplicity.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In re Nutjten to fall outside the scope of patentable subject matter under 35 U.S.C. § 101.

The disclosure and claims do not describe only a particular outcome of integrating a shared blockchain-enabled dataset across different database structures, but the disclosure and claims include specific rules for implementing the outcome of integrating a shared blockchain-enabled dataset across different database structures and that render information into a specific format that is then used and applied to create the desired results of integrating a shared blockchain-enabled dataset across different database structures, as set forth in *McRO, Inc. v. Bandai Namco Games America Inc.* (Fed. Cir. case number 15-1080, Sep. 13, 2016). In other words, the outcome of integrating a shared blockchain-enabled dataset across different database structures can be performed by many different types of rules and combinations of rules, and this disclosure includes various embodiments with specific rules. While the absence of complete preemption may not guarantee that a claim is eligible, the disclosure does not sufficiently preempt the field of integrating a shared blockchain-enabled dataset across different database structures at all. The disclosure acts to narrow, confine, and otherwise tie down the disclosure so as not to cover the general abstract idea of just integrating a shared blockchain-enabled dataset across different database structures. Significantly, other systems and methods exist for integrating a shared blockchain-enabled dataset across different database structures, so it would be inappropriate to assert that the claimed invention preempts the field or monopolizes the basic tools of integrating a shared blockchain-enabled dataset across different database structures. In other words, the disclosure will not prevent others from integrating a shared blockchain-enabled dataset across different database structures, because other systems are already performing the functionality in different ways than the claimed invention. Moreover, the claimed invention includes an inventive concept that may be found in the non-conventional and non-generic arrangement of known, conventional pieces, in conformance with *Bascom v. AT&T Mobility*, 2015-1763 (Fed. Cir. 2016). The disclosure and claims go way beyond any conventionality of any one of the systems in that the interaction and synergy of the systems leads to additional functionality that is not provided by any one of the systems operating independently. The disclosure and claims may also include the interaction between multiple different systems, so the disclosure cannot be considered an implementation of a generic computer, or just "apply it" to an abstract process. The disclosure and claims may also be directed to improvements to software with a specific implementation of a solution to a problem in the software arts.

In various embodiments, the systems and methods may include a graphical user interface for dynamically relocating/rescaling obscured textual information of an underlying window to become automatically viewable to the user (e.g., via user terminal in one or more entity systems 110-1, 110-2, 110-*n*). By permitting textual information to be dynamically relocated based on an overlap condition, the computer's ability to display information is improved. More particularly, the method for dynamically relocating textual information within an underlying window displayed in a graphical user interface may comprise displaying a first window containing textual information in a first format within a graphical user interface on a computer screen; displaying a second window within the graphical user interface; constantly monitoring the boundaries of the first window and the second window to detect an overlap condition where the second window overlaps the first window such that the textual information in the first window is obscured from a user's view; determining the textual information would not be completely viewable if relocated to an unobstructed portion of the first window; calculating a first measure of the area of the first window and a second measure of the area of the unobstructed portion of the first window; calculating a scaling factor which is proportional to the difference between the first measure and the second measure; scaling the textual information based upon the scaling factor; automatically relocating the scaled textual information, by a processor, to the unobscured portion of the first window in a second format during an overlap condition so that the entire scaled textual information is viewable on the computer screen by the user; and automatically returning the relocated scaled textual information, by the processor, to the first format within the first window when the overlap condition no longer exists.

In various embodiments, the system may also include isolating and removing malicious code from electronic messages (e.g., transaction messages, dataset update requests, consented dataset update requests, etc.) to prevent a computer or network from being compromised, for example by being infected with a computer virus. The system may scan electronic communications for malicious computer code and clean the electronic communication before it may initiate malicious acts. The system operates by physically isolating a received electronic communication in a "quarantine" sector of the computer memory. A quarantine sector is a memory sector created by the computer's operating system such that files stored in that sector are not permitted to act on files outside that sector. When a communication containing malicious code is stored in the quarantine sector, the data contained within the communication is compared to malicious code-indicative patterns stored within a signature database. The presence of a particular malicious code-indicative pattern indicates the nature of the malicious code. The signature database further includes code markers that represent the beginning and end points of the malicious code. The malicious code is then extracted from malicious code-containing communication. An extraction routine is run by a file parsing component of the processing unit. The file parsing routine performs the following operations: scan the communication for the identified beginning malicious code marker; flag each scanned byte between the beginning marker and the successive end malicious code marker; continue scanning until no further beginning malicious code marker is found; and create a new data file by sequentially copying all non-flagged data bytes into the new file, which forms a sanitized communication file. The new, sanitized communication is transferred to a non-quarantine sector of the computer memory. Subsequently, all data on the quarantine sector is erased. More particularly, the system includes a method for protecting a computer from an electronic communication containing malicious code by receiving an electronic communication containing malicious code in a computer with a memory having a boot sector, a quarantine sector and a non-quarantine sector; storing the communication in the quarantine sector of the memory of the computer, wherein the quarantine sector is isolated from the boot and the non-quarantine sector in the computer memory, where code in the quarantine sector is prevented from performing write actions on other memory sectors; extracting, via file parsing, the malicious code from the electronic communication to create a sanitized electronic communication, wherein the extracting comprises scanning the communication for an identified beginning malicious code marker, flagging each scanned byte between the beginning marker and a successive end malicious code marker, continuing scanning until no further beginning malicious code marker is found, and creating a new data file by sequentially copying all non-flagged data bytes into a new file that forms a sanitized communication file; transferring the sanitized electronic communication to the non-quarantine sector of the memory; and deleting all data remaining in the quarantine sector.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to 'at least one of A, B, and C' or 'at least one of A, B, or C' is used in the claims or specification, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Although the disclosure includes a method, it is contemplated that it may be embodied as computer program instructions on a tangible computer-readable carrier, such as a magnetic or optical memory or a magnetic or optical disk. All structural, chemical, and functional equivalents to the elements of the above-described various embodiments that are known to those of ordinary skill in the art are expressly incorporated herein by reference and are intended to be encompassed by the present claims.

Moreover, it is not necessary for a device or method to address each and every problem sought to be solved by the present disclosure, for it to be encompassed by the present claims. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A computer-based system, comprising:
    a first integration platform comprising at least one computing device having a processor and a tangible, non-transitory memory, the first integration platform being in data communication with a peer-to-peer network comprising a second integration platform, the first integration platform and the second integration platform being configured to write to a distributed ledger upon a consensus agreement, and the first integration platform and the second integration platform each comprising a smart contract configured to control dataflow for different updates to the distributed ledger; and
    at least one application stored in the tangible, non-transitory memory and executable by the at least one computing device, wherein, in response to execution by the at least one computing device, cause the at least one computing device to at least:
    receive a dataset update request comprising instructions to update a shared dataset in the distributed ledger, wherein the shared dataset is stored in a first data structure in the first integration platform according to a first data format;
    broadcast the dataset update request to the second integration platform in the peer-to-peer network, wherein in response to receiving the dataset update request the second integration platform is configured to consent to the dataset update request based at least in part on the consensus agreement;
    receive a consented dataset update request, wherein the consented dataset update request is formatted in a second data format;
    invoke, via the smart contract executed by the at least one computing device, a mapping module to determine that the second data format of the consented dataset update request fails to match the first data format of the first data structure; and
    reformat the consented dataset update request to comprise the first data format.

2. The computer-based system of claim 1, wherein, when executed, the at least one application further causes the at least one computing device to at least write the consented dataset update request to the shared dataset in the first data structure.

3. The computer-based system of claim 1, wherein in response to consenting to the dataset update request, the second integration platform broadcasts the consented dataset update request over the peer-to-peer network.

4. The computer-based system of claim 3, wherein the second integration platform writes the consented dataset update request to the shared dataset in a second data structure associated with the second integration platform.

5. The computer-based system of claim 1, wherein, when executed, the at least one application further causes the at least one computing device to at least sign, via a cryptography module invoked via the smart contract, the dataset update request using a public key associated with the first integration platform.

6. The computer-based system of claim 1, wherein the consensus agreement comprises at least one of proof of work, proof of stake, practical byzantine fault tolerance, or delegated proof of stake.

7. The computer-based system of claim 1, wherein the consensus agreement requires consent from all integration platforms in the peer-to-peer network.

8. A method comprising:
receiving, by at least one computing device of a first integration platform, a dataset update request comprising instructions to update a shared dataset of a distributed ledger, wherein the shared dataset is stored in a first data structure in the first integration platform according to a first data format, the first integration platform is in data communication with a peer-to-peer network comprising a second integration platform, the first integration platform and the second integration platform are configured to write to the distributed ledger upon a consensus agreement, and the first integration platform and the second integration platform comprise a smart contract configured to control dataflow for different updates to the distributed ledger;
broadcasting, by the at least one computing device of the first integration platform in electronic communication with the peer-to-peer network, the dataset update request to the second integration platform in the peer-to-peer network, wherein in response to receiving the dataset update request the second integration platform is configured to consent to the dataset update request based at least in part on the consensus agreement;
receiving, by the at least one computing device of the first integration platform, a consented dataset update request, wherein the consented dataset update request is formatted in a second data format;
invoking, via the smart contract executed by the at least one computing device of the first integration platform, a mapping module to determine that the second data format of the consented dataset update request fails to match the first data format of the first data structure; and
reformatting the consented dataset update request to comprise the first data format.

9. The method of claim 8, further comprising writing, by the at least one computing device of the first integration platform, the consented dataset update request to the shared dataset in the first data structure.

10. The method of claim 8, wherein, in response to consenting to the dataset update request, the second integration platform broadcasts the consented dataset update request over the peer-to-peer network.

11. The method of claim 10, wherein the second integration platform writes the consented dataset update request to the shared dataset in a second data structure associated with the second integration platform.

12. The method of claim 8, further comprising signing, by the at least one computing device of the first integration platform and via a cryptography module invoked by the smart contract, the dataset update request using a public key associated with the first integration platform.

13. The method of claim 8, wherein the consensus agreement comprises at least one of proof of work, proof of stake, practical byzantine fault tolerance, or delegated proof of stake.

14. The method of claim 8, wherein the consensus agreement requires consent from all integration platforms in the peer-to-peer network.

15. An article of manufacture including a non-transitory, tangible computer readable storage medium having instructions stored thereon that, in response to execution by a first integration platform in data communication with a peer-to-peer network comprising a second integration platform, cause the first integration platform to perform operations comprising:
receiving, by the first integration platform, a dataset update request comprising a request to update a shared dataset to a distributed ledger, wherein the shared dataset is stored in a first data structure in the first integration platform according to a first data format, the first integration platform is configured to write updates to the distributed ledger upon a consensus agreement with at least the second integration platform of the peer-to-peer network; and the first integration platform comprises a smart contract configured to control dataflow for different updates to the distributed ledger;
broadcasting, by the fit integration platform in electronic communication with the peer-to-peer network, the dataset update request to the second integration platform in the peer-to-peer network, wherein in response to receiving the dataset update request the second integration platform is configured to consent to the dataset update request based at least in part on the consensus agreement;
receiving, by the first integration platform, a consented dataset update request, wherein the consented dataset update request is formatted in a second data format;
invoking, via the smart contract executed by the first integration platform, a mapping module to determine that the second data format of the consented dataset update request fails to match the first data format of the first data structure; and
reformatting the consented dataset update request to comprise the first data format.

16. The article of manufacture of claim 15, wherein in response to execution by the first integration platform, the instructions further cause the first integration platform to at least write the consented dataset update request to the shared dataset in the first data structure.

17. The article of manufacture of claim 15, wherein in response to consenting to the dataset update request, the second integration platform broadcasts the consented dataset update request over the peer-to-peer network.

18. The article of manufacture of claim 17, wherein the second integration platform writes the consented dataset update request to the shared dataset in a second data structure associated with the second integration platform.

19. The article of manufacture of claim 15, wherein in response to execution by the first integration platform, the instructions further cause the first integration platform to at least sign, via a cryptography module invoked by the smart contract, the dataset update request using a public key associated with the first integration platform.

20. The article of manufacture of claim 15, wherein the consensus agreement comprises at least one of proof of work, proof of stake, practical byzantine fault tolerance, delegated proof of stake, or requires consent from all integration platforms in the peer-to-peer network.

* * * * *